March 15, 1966  R. D. LAUTZENHEISER  3,240,247
SHREDDING MACHINE
Filed Oct. 18, 1963  2 Sheets-Sheet 1
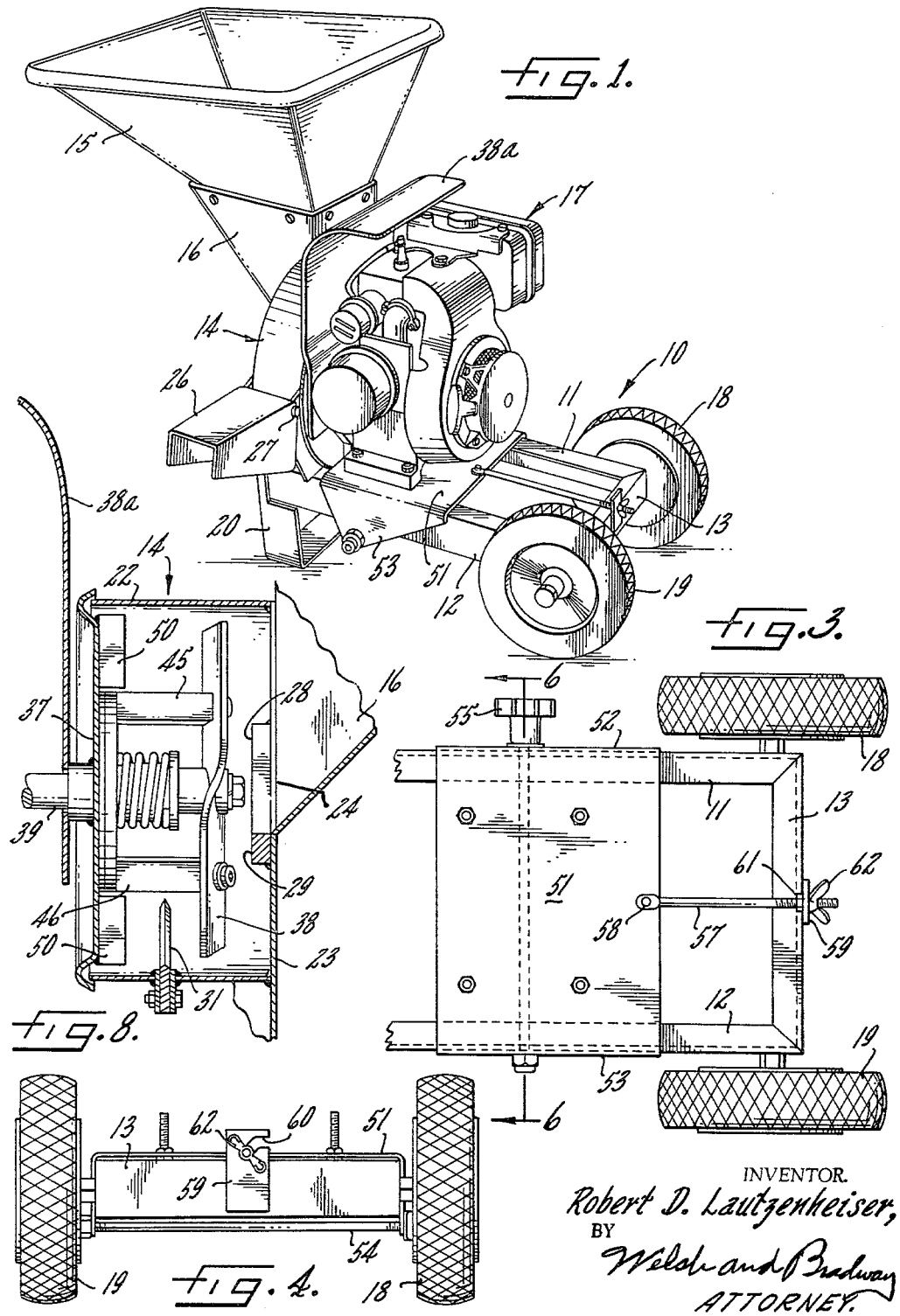
INVENTOR.
Robert D. Lautzenheiser,
BY
Welch and Bradway
ATTORNEY.

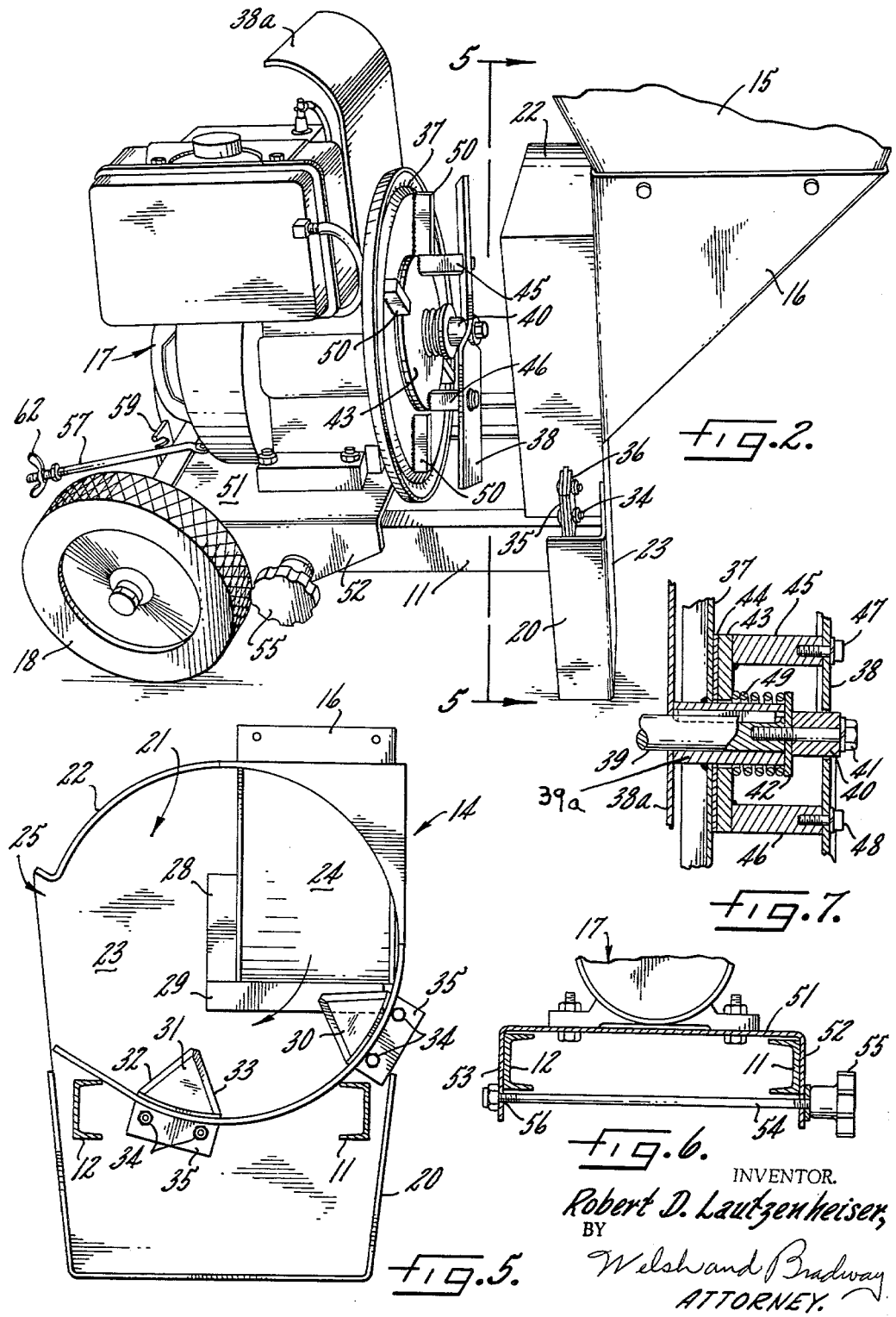
March 15, 1966     R. D. LAUTZENHEISER     3,240,247
SHREDDING MACHINE
Filed Oct. 18, 1963     2 Sheets-Sheet 2
INVENTOR.
Robert D. Lautzenheiser,
BY Welsh and Bradway
ATTORNEY.

United States Patent Office 3,240,247
Patented Mar. 15, 1966

3,240,247
SHREDDING MACHINE
Robert D. Lautzenheiser, Bluffton, Ind., assignor to The
Red Cross Manufacturing Corporation
Filed Oct. 18, 1963, Ser. No. 317,367
13 Claims. (Cl. 146—107)

The present invention is directed to new and useful improvements in shredding machines, which are particularly useful with shredding compost materials.

Many prior shredding machines have used a hammermill principle wherein rotating knives or blades are used to cut and chop material through repeated agitation of the material and cutting or breaking of such material until it has been reduced to a size which will pass through a screen-like discharge opening from the machine. In machines of this type, the machine may become clogged because elongated vine-like strands of material have a tendency to wrap themselves around the drive shaft for the rotating elements. Some materials, such as leaves, or the like, tend to clog the screen of the discharge opening. The screened discharge opening of these prior machines is easily clogged with wet materials with the result that the machine must be broken down and cleaned before it can be returned to useful service. Furthermore, in machines of this type, the screen limits the discharge velocity of the shredded material so that piles of the shredded material are formed very close to the machine with the result that the machine must be stopped relatively frequently to either move the machine or the pile of shredded material.

The present invention seeks to avoid these and other difficulties of prior shredding machines by so forming a shredding housing and rotating shredding elements that no discharge screen is necessary, the present machine being characterized by a relatively large discharge opening. The present shredding machine operates on the principle of reducing material fed to the machine at such a speed that it is finely comminuted before it reaches the area of the discharge opening. With this principle and the large discharge opening, the rate of feed and the rate of shredding may be increased and the machine may be efficiently utilized to shred wet or green materials. Furthermore, any tendency for material to wrap itself around the shaft of the rotating shredding elements is minimized since materials are chopped or broken into small particles before they have a chance to reach the area of the supporting shaft.

Other and further purposes of the invention are to so arrange a shredding housing and drive motor for the housing that the housing may be easily and readily opened for purposes of cleaning the housing, to so arrange a shredding machine that material passing to the shredding space is initially broken or cut into small pieces as it enters the space and then finely chopped as it passes through the space for expulsion from the machine, to so arrange a shredding machine that greatly increased discharge forces are imparted to the shredding material, thereby enabling convenient use of a discharge opening at the side of the machine and the constant formation of a pile of shredded material some distance away from one side of the machine, all while so arranging the various elements of the machine that any breakage of parts in the machine is limited to elements of lesser expense, and while so arranging the various elements of the machine that they are easily manufactured and assembled.

These and other purposes of the invention will become more apparent in the course of the ensuing specification and claims when taken with the accompanying drawings in which:

FIGURE 1 is a perspective view of the shredding machine of the present invention in a position of use;

FIGURE 2 is a side view of the machine illustrated in FIGURE 1 but illustrating separation of a shredding housing from the drive motor and rotating elements;

FIGURE 3 is a top view of a rearward portion of the machine illustrated in FIGURES 1 and 2 and particularly illustrating certain locking instrumentalities;

FIGURE 4 is an end view of the portion of the machine illustrated in FIGURE 3;

FIGURE 5 is an end view of the shredding housing illustrated in FIGURES 1 and 2;

FIGURE 6 is a diagrammatic view of certain details of the supporting framework of the machine;

FIGURE 7 is a sectional view illustrating certain driving connections in the machine; and FIGURE 8 is a diagrammatic illustration, in section, of the relation of the shredding housing and blades.

Like elements are designated by like characters throughout the specification and drawings.

Referring specifically now to the drawings and in the first instance the FIGURE 1, the shredding machine incorporating the principles of the invention is designated generally at 10. The machine includes a base comprised of spaced, generally parallel frame members 11 and 12 and a cross frame member 13 at one end of the frame. The frame members 11 and 12 are joined to a shredding housing generally designated at 14 at the other end thereof. A hopper 15 is joined to an inlet chute 16 which is fixed to the outer end wall of housing 14.

A prime mover 17, which may take the form of a gasoline engine, is supported on the base and is in driving relation to rotating shredding elements positioned within housing 14.

One end of the base may be supported on wheels 18 and 19 to enable portability of the machine while the other end of the base may be adapted to rest on a supporting stand 20, which is fixed to housing 14 and to frame members 11 and 12, and in depending relation to the frame members.

The shredding housing 14 is formed to define a generally cylindrical space 21. This cylindrical space 21 is formed about the axis of the motor output shaft as a center and is defined by a generally cylindrical wall 22 and an end wall 23. An upper portion of the end wall 23 has a inlet opening 24 formed therein. This inlet opeing is in commuication with the feed chute 16 and is positioned at one side of the axis of the cylindrical housing. A discharge opening 25 is formed in the cylindrical side wall 22 of the housing at a point on the other side of the axis but at a lower portion of the housing. A three-sided and downwardly open deflector plate 26 is pivotally mounted on the housing as at 27 so that material expelled through the discharge opening 25 is guided by the deflector plate 26 in the form of a defined stream of material. By adjusting the deflector plate 26 upwards or downwards, the direction of the discharge stream may be varied as an aid in the deposit of shredded materials at varying distances from the machine.

Bars 28 and 29 are positioned along the lower edge and along the inner side edge of the inlet opening 24. These bars are of relatively thick stock and not only reinforce the boundary region of the end wall 23 around the inlet opening but also assist in breaking material entering the housing in a manner which will be described.

Knife blades 30 and 31 are fixed to the lower circumferences of the housing wall 22, and are positioned approximately medially of the axial length of the cylindrical wall 22. These knives have a generally triangular form with the apexes thereof facing the center of the housing and with sharpened edges 32 and 33 leading from the cylindrical side wall 22 inwardly. These knife blades are inserted through slots formed in the cylindrical wall 22 and are held in position by means of bolt fasteners 34 which project through flanges 35 and 36 on the exterior of the side wall and through the outwardly projecting portion of the knives. This arrangement allows convenient reversibility of the knives in the event one of their edges become worn. It also allows convenient replacement of the knives in the event that they are broken.

In further accordance with the principles of the invention, that end wall of the housing facing the engine 17 is open and is removably closed by means of a circular plate 37 carried on the outlet shaft of the engine. This circular plate 37 is located adjacent a shield 38a for the engine. Circular plate 37 is adapted for rotation with the engine shaft and with a blade 38 which is coupled therewith by means of a friction clutch assembly illustrated in FIGURE 7. Blade 38 has the two opposite portions thereof twisted so as to create a fan action and wind force tending to pull materials into the housing. In FIGURE 7, it will be seen that the plate or disc 37 is attached to a collar 39a which is keyed to the motor shaft 39 for positive rotation therewith. The blade 38 is freely mounted on a bushing 40 which is connected to the end of the engine shaft 39 by means of a bolt 41. A washer 42 is interposed between the bushing 40 and the end of the engine shaft 39.

A clutch plate 43 is freely mounted on the collar 39a of the engine shaft 39 at a point closely adjacent to the plate 37 and a clutch disc 44 of suitable composition material is positioned between the plate 37 and clutch plate 43. The clutch plate 43 is fixed to the blade 38 by means of bars 45 and 46 which are welded or otherwise fixed to the clutch plate 43 and which are bolted to the oppositely extending portions of blade 38 as by means of bolts 47 and 48.

A spring 49 is interposed between washer 42 and the cluch plate 43 so as to resiliently urge clutch plate 43 tightly against the disc 44 and the plate 37 thereby causing a frictional driving arrangement with the plate 37. In the event an obstruction tends to stall the blade 38 and motor, the spring 49 allows the clutch plate and blade to yield away from disc 37 sufficiently to allow the disc 37 and motor shaft to rotate while the blade 38 is held essentially stationary.

Plate 37 not only functions to close the interior end of the shredding housing but also functions as an impeller to assist in moving materials within the shredding housing toward the discharge opening 25. To assist in this impelling function, radially extending bars 50 may be fixed to the blade side of the plate 37 in circumferentially spaced relation. Bars 50 act somewhat in the nature of paddle blades in expelling material from the interior of the shredding housing.

The blade 38 is positioned at a distance from the disc 37 such that when the disc 37 closes the end wall of the housing opposite to end wall 23, the blade 38 is between the inlet 24 and the knives 30 and 31. The blade thus passes fairly close to the breaker bars 28 and 29 and fairly close to the knives 30 and 31. The circular area described by the blade 38, during rotation thereof, overlaps the area of the inlet opening as well as the areas of the knives 30 and 31.

The base structure is sectionally formed so as to allow relative movement of the motor section and the remainder thereof between positions wherein the rotating plate 37 closes the shredding housing, as in FIGURE 1, and a position where it is spaced therefrom, as in FIGURE 2. For this purpose, the engine 17 is mounted on a plate 51 which has depending side portions 52 and 53 overlying the sides of the frame members 11 and 12. A locking rod 54 is passed through the depending portions 52 and 53 and has a threaded engagement with a knob 55 at one end thereof. The other end of the rod 56 is held on depending portion 53 in any suitable manner. By rotating the adjustment knob 55, the depending portions 52 and 53 may be pressed towards one another and against the sides of the frame members 11 and 12, thus causing a binding, frictional lock of the motor and rotating element assembly in a selected position. By loosening the knob, this binding engagement is loosened so as to alohw sliding movement of the plate 51 on the frame members 11 and 12.

In order to hold the motor and rotating elements positively locked in the shredding position of FIGURE 1, an adgditional locking rod 57 is connected to plate 51 as by means of a pivot 58. Rod 57 is adapted to extend parallel to frame members 11 and 12 and parallel to the motor shaft. This locking rod has a detachable engagement with an element 59 on the transverse frame member 13. Element 59 may have a recess 60 formed therein to receive the rod 57. The rod 57 may be detachably held in this position by means of first and second nuts 61 and 62 carried on a threaded end portion of the rod 57 and in spaced relation. By loosening one or both of the nuts 61 and 62, the rod may be removed from the recess to allow withdrawal of the motor assembly from the shredding housing. The rod 57 is held in the locked position by rotating one or the other of the nuts 61 and 62, or both of them, until a tight binding engagement is obtained with the locking element 59.

In use, the machine may be easily transported from one location to another. Material to be shredded, such as silage, prunings, manure, vines, garbage, is fed into the inlet hopper where it eventually passes to the lower portion of the hopper and to the outlet opening. As the materials are fed into the hopper and downward therethrough, they are forced through the inlet opening of the shredding housing. They may be forced by hand. Some elongated materials will be pulled through the inlet opening by the action of the rotating blade. Light materials, such as leaves, may be "pulled" in by the suction force of the blade. As these materials pass through the opening, the rotating blade, in cooperation with the breaker bars positioned adjacent the inlet opening, breaks or cuts this material into relatively small pieces. In this regard, the motor may be driven at relatively high speeds. If driven at about 3000 r.p.m. for example, the rotating knife makes 100 passes per second past the inlet opening so that if material is fed into the inlet opening at the rate of 2 feet per second, this material may be broken or cut into quarter inch lengths upon entering the shredding housing.

As these short lengths of material continue their movement into the shredding space within the housing, they are given a repeated comminuting, cutting or breaking action by the cooperative action of the rotating blade and stationary blades which are positioned around the lower portion of the generally cylindrical housing. With the blade rotating clockwise, as seen in FIGURE 5, this material is forced towards the discharge opening at the side of the housing. The material may be thrown through the discharge opening by the centrifugal force of the rotating blade itself. The twist of the blade enables the blade to "sweep" most of the area between the inlet and the stationary knives. Any material which passes the stationary blades (in directions parallel to the axis of rotation) and toward the motor side of the housing, is contacted by the rotating plate, which expels such material by centrifugal force towards and through the discharge opening.

The impelling force is relatively high so that shredded material is thrown through the discharge opening and to a point which may be several feet or more from the side of the machine. This enables formation of a pile of compost or shredded material laterally to one side of the machine so that the machine may be constantly operated until a relatively large pile of material is formed. This is in marked contrast to machines using a screen discharge, since in these machines the machine must be stopped periodically at relatively small time intervals to move either the pile of material from the machine or the machine from the pile.

If for any reason the machine becomes clogged, the slip clutch between the rotating blade and the motor will allow the motor to continue to run while the blade is held essentially stationary. The motor can then be stopped and by loosening the longitudinal locking rod and the clamping member the entire motor, rotating disc and rotating blade may be moved away from the shredding housing, as appears in FIGURE 2, thereby exposing the interior of the housing. The interior of the housing and/or rotating blade may be cleaned as required.

The stationary blades are relatively light in weight and will tend to break away in the event that some heavy foreign object is in the interior of the machine. They are easily removed by removing the fastening bolts. This tends to protect the other and more expensive parts of the machine. These stationary blades may be reversed when their edges become worn.

All rotating parts of the machine are connected directly with the crank shaft of the prime mover so that they may be assembled therewith in simple fashion. After such assembly, the motor and rotating parts are easily mounted on the supporting frame and moved into the operating position by a mere sliding movement therewith toward the shredding housing.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A shredding device for compost and the like including a base and a shredding housing positioned on said base, a motor supported on said base, said motor having an output shaft with a disc rotating therewith, said disc being positioned at one side of said housing and within an opening in that side of said housing, said housing having inlet and outlet openings thereto, shredding means carried by said motor shaft and positioned within said housing, said base being formed from plural, relatively movable sections with said motor being supported on one section and said shredding housing being supported on said other section, means for holding said two sections in one position wherein said disc is in said housing opening, and means for releasing said holding means so as to allow movement of said motor and said shredding housing away from one another to thereby expose the interior of said housing through said side opening.

2. A shredder for compost and the like including a base and a shredding housing mounted on said base, said shredding housing having an inlet opening and an outlet opening, a shredding element rotatably mounted within said housing and means for rotating said element, one side of said housing having an additional opening therein, and a plate positioned within said opening and having an area generally coextensive with the area of said additional opening thereby closing said additional opening, said plate being rotatable with said element, said housing having stationary knife blades extending within said housing and in overlapping relation to the circular area described by said rotating element.

3. A shredder for compost and the like including a base and a shredding housing mounted on said base, said shredding housing having an inlet opening and an outlet opening, a shredding element rotatably mounted within said housing and means for rotating said element, one side of said housing having an additional opening therein and a plate positioned within said opening and having an area generally coextensive with the area of said additional opening thereby closing said additional opening, said plate being rotatable with said element, said inlet opening overlying at least a portion of the circular area described by said blade during rotation of said blade, said inlet opening having stationary breaker means positioned around an edge portion thereof and in overlapping relation to and adjacent said area.

4. A shredder for compost and the like including a base and a shredding housing mounted on said base, said shredding housing having an inlet opening and an outlet opening, a shredding element rotatably mounted within said housing and means for rotating said element, one side of said housing having an additional opening therein, and a plate positioned within said opening and having an area generally coextensive with the area of said additional opening thereby closing said additional opening, said plate being rotatable with said element, said rotating disc including angularly spaced, radially extending bars on that surface thereof facing the interior of said housing.

5. A shredder for compost and the like including a base and a shredding housing mounted on said base, said shredding housing having an inlet opening and an outlet opening, a shredding element rotatably mounted within said housing and means for rotating said element, one side of said housing having an additional opening therein, and a plate positioned within said opening and spaced from said element, said plate having an area generally coextensive with the area of said additional opening thereby closing said additional opening, said plate being rotatable with said element about a common axis and being co-operable with said element for moving material within said housing and expelling material through said outlet opening.

6. A shredder for compost and the like including a wheel supported base, said base having a shredding housing with inlet and outlet openings therein, said base including spaced and generally parallel frame members, a drive motor slidably mounted on said frame members for movement toward and away from said housing, means for holding said motor in a fixed position on said frame members, a rotating blade carried by the output shaft of said motor and positioned within said housing, one side of said housing having an opening therein to permit removal of said blade therethrough, and removable means for closing said opening.

7. The structure of claim 6 wherein said removable means includes a plate corresponding generally to the size and configuration of said opening and supported on said motor shaft.

8. The structure of claim 6 wherein said motor is mounted on a plate having depending portions in overlapping and sliding engagement with said frame members, and said holding means includes means for clamping said depending portions against said frame members.

9. The structure of claim 6 wherein said holding means includes a locking rod mounted for movement with said drive motor and formed and adapted to extend generally parallel to said output shaft, said rod having means releasably engageable with an element on said base.

10. A rotatable shredding and discharging assembly for use in a shredding space within a shredding housing including an engine output shaft, a disc coupled to said shaft for rotation therewith about the axis of said shaft, said disc having one face opposed to material in said housing to thereby move material by contact with said face, a blade coupled to said shaft by bearing means, said blade being axially spaced from said disc and rotatable about said axis, said disc having an area generally coextensive with the area described by said blade during rotation thereof, and slip clutch means between said blade and disc to thereby allow rotation of said blade and disc together for a co-operable material shredding and moving action while allowing rotation of said disc when said blade is stalled.

11. The structure of claim 10 wherein said slip clutch means includes a clutch plate positioned adjacent said disc and fixed to said blade, resilient means for urging said plate into a frictional driving engagement with said disc, said bearing means including means for allowing relative rotation of said blade and disc when said clutch plate is spaced from said disc.

12. A shredder for compost and the like including a shredding housing defining a shredding space therein, inlet means in said housing for feeding material to said space, outlet means in said housing for discharging material from said space, a shredding blade within said space and opposed to said inlet, a power shaft for rotating said blade, a disc carried by said power shaft in axially spaced relation to said blade, said disc being rotatable with said blade for a co-operable shredding and discharging action, and stationary knife means carried by said housing and positioned between said blade and disc and extending within the circular space described by the blade and disc during rotation thereof.

13. The structure of claim 12 characterized by and including radially extending impeller bars on that side of the disc facing said blade, said bars being spaced from said blade and being spaced from one another on said disc.

References Cited by the Examiner

UNITED STATES PATENTS

| | | | |
|---|---|---|---|
| 1,575,853 | 3/1926 | MacGregor | 146—106 |
| 1,825,838 | 10/1931 | Wessman | 146—107 |
| 2,229,896 | 1/1941 | Matthiesen | 146—6 |
| 2,770,115 | 11/1956 | Ober | 64—30 |
| 3,076,489 | 2/1963 | Schmidt et al. | 146—182 |
| 3,091,269 | 5/1963 | Burns et al. | 146—78 |

FOREIGN PATENTS 289,074    6/1929    Great Britain.

ROBERT C. RIORDON, *Primary Examiner.*

J. SPENCER OVERHOLSER, *Examiner.*